United States Patent
Lin

(10) Patent No.: US 10,845,887 B2
(45) Date of Patent: Nov. 24, 2020

(54) KEY PROCESSING METHOD AND APPARATUS, AND APPARATUS FOR KEY PROCESSING

(71) Applicant: BEIJING SOGOU TECHNOLOGY DEVELOPMENT CO., LTD., Beijing (CN)

(72) Inventor: Changqing Lin, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/073,185

(22) PCT Filed: Dec. 15, 2016

(86) PCT No.: PCT/CN2016/110135
§ 371 (c)(1),
(2) Date: Jul. 26, 2018

(87) PCT Pub. No.: WO2017/128884
PCT Pub. Date: Aug. 3, 2017

(65) Prior Publication Data
US 2019/0033983 A1    Jan. 31, 2019

(30) Foreign Application Priority Data
Jan. 27, 2016  (CN) .......................... 2016 1 0057082

(51) Int. Cl.
*G06F 3/02*  (2006.01)
*G06F 3/023*  (2006.01)
(Continued)

(52) U.S. Cl.
CPC .......... *G06F 3/0219* (2013.01); *G06F 3/0237* (2013.01); *G06F 3/04812* (2013.01); *G06F 3/04886* (2013.01)

(58) Field of Classification Search
CPC ............... G06F 3/0219; G06F 3/04812; G06F 3/04886; G06F 3/0236; G06F 3/0238;
(Continued)

(56) References Cited

U.S. PATENT DOCUMENTS

| 6,466,202 B1* | 10/2002 | Suso ...................... | G06F 1/1616 345/169 |
| 2003/0101178 A1* | 5/2003 | Miyata .................. | G06F 3/0489 |

(Continued)

FOREIGN PATENT DOCUMENTS

| CN | 101150618 A | 3/2008 |
| CN | 102915122 A | 2/2013 |
| CN | 104834402 A | 8/2015 |

OTHER PUBLICATIONS

The World Intellectual Property Organization (WIPO) International Search Report for PCT/CN2016/110135 dated Mar. 16, 2017 6 Pages.

*Primary Examiner* — Richard J Hong
(74) *Attorney, Agent, or Firm* — Anova Law Group, PLLC

(57) ABSTRACT

The present disclosure provides a key processing method and apparatus, and an apparatus for key processing. The key processing method specifically includes processing a non-triggered key in response to a triggering operation by a user on a current key in a current interface where the non-triggered key is a key in the current interface other than the current key, and outputting a processing result of the non-triggered key. The embodiments of the present disclosure not only enrich the current interface, but also enhance the feedback effectiveness and user experience during the use of the interface. Thus, the accuracy of the key operation may be improved.

15 Claims, 9 Drawing Sheets

(51) Int. Cl.
*G06F 3/0481* (2013.01)
*G06F 3/0488* (2013.01)

(58) Field of Classification Search
CPC .... G06F 3/0235; G06F 1/1616; G06F 3/0489; G06F 3/0237; G09B 5/06; G03B 21/00; H04L 51/10
See application file for complete search history.

(56) References Cited

U.S. PATENT DOCUMENTS

| | | | |
|---|---|---|---|
| 2006/0053386 A1* | 3/2006 | Kuhl | G06F 3/0236 715/773 |
| 2006/0221059 A1* | 10/2006 | Choi | G06F 3/0238 345/169 |
| 2008/0244446 A1* | 10/2008 | LeFevre | G06F 3/0236 715/810 |
| 2012/0326988 A1* | 12/2012 | Woo | G06F 3/0235 345/171 |
| 2013/0065204 A1* | 3/2013 | LoStracco | G09B 5/06 434/156 |
| 2014/0047394 A1 | 2/2014 | Kushler | |
| 2014/0245177 A1* | 8/2014 | Maklouf | G06F 3/0236 715/752 |
| 2016/0291822 A1* | 10/2016 | Ahuja | H04L 51/10 |
| 2016/0349926 A1* | 12/2016 | Okumura | G03B 21/00 |
| 2017/0192671 A1* | 7/2017 | Osborne | G06F 3/0236 |
| 2018/0329625 A1* | 11/2018 | Griffin | G06F 3/0237 |

\* cited by examiner

KEY PROCESSING METHOD AND APPARATUS, AND APPARATUS FOR KEY PROCESSING

CROSS-REFERENCE TO RELATED APPLICATIONS

This application is a national phase entry under 35 U.S.C. § 371 of International Application No. PCT/CN2016/110135, filed on Dec. 15, 2016, which claims the priority of Chinese patent application filed on Jan. 27, 2016 in the Chinese Patent Office with the application number 201610057082.2 and entitled "Key Processing Method and Apparatus, and Apparatus for Key Processing", the entire contents of all of which are incorporated herein by reference.

FIELD OF THE DISCLOSURE

The present disclosure generally relates to the field of intelligent terminal technology and, more particularly, relates to a key processing method, a key processing apparatus, and an apparatus for key processing.

BACKGROUND

Currently, computers, smart phones, personal digital assistant devices, and other smart terminals often include a keyboard as an input device. In particular, the keyboard may include at least one key. The at least one key may facilitate the smart terminals to input content and to perform a function accordingly. In practical applications, the keyboard may be a physical keyboard or a virtual keyboard. The keyboard may be a 9-key keyboard or a 26-key keyboard.

The existing key processing solution may often include executing an event corresponding to a current key after a triggering operation on the current key is received in the current interface. In one example, when information is inputted through a Chinese Pinyin input method and the "Q" key on a 26-key keyboard is pressed or clicked by a user, the "Q" key may be outputted to a syllable section of the input method. In another example, when information is inputted through an English input method and the "Q" key on the 26-key keyboard is pressed or clicked by the user, the "Q" key may be shown on a display screen.

Although logically simple, the existing key processing solution may only execute an event corresponding to an operation on the current key only to provide monotonous key processing effect.

BRIEF SUMMARY OF THE DISCLOSURE

In view of the above problems, the embodiments of the present disclosure have been proposed to provide a key processing method, a key processing apparatus, and an apparatus for key processing, capable of not only enriching the current interface, but also enhancing the feedback effectiveness and user experience during the use of the interface. Thus, the accuracy of the key operation may be improved.

To solve the above problems, one aspect of the present disclosure provides a key processing method. The method includes processing a non-triggered key in response to a triggering operation by a user on a current key in a current interface where the non-triggered key is a key in the current interface other than the current key, and outputting a processing result of the non-triggered key.

Another aspect of the present disclosure provides a key processing apparatus. The apparatus includes a processing module configured to process a non-triggered key in response to a triggering operation by a user on a current key in a current interface where the non-triggered key is a key in the current interface other than the current key, and an output module configured to output a processing result of the non-triggered key.

Another aspect of the present disclosure provides an apparatus for key processing, comprising a memory and one or more programs stored in the memory. One or more processors are configured to execute the one or more programs to perform instructions of processing a non-triggered key in response to a triggering operation by a user on a current key in a current interface where the non-triggered key is a key in the current interface other than the current key, and outputting a processing result of the non-triggered key.

The embodiments of the present disclosure include the following advantages.

The embodiments of the present disclosure process the non-triggered key in response to the triggering operation by the user on the current key in the current interface where the non-triggered key could be any key excluding the current key in the current interface, and output a processing result of the non-triggered key. Compared to the existing key processing solution which only executes the operation corresponding to the current key, the embodiments of the present disclosure output the processing result of the non-triggered keys to the user based on the current key, and reflect the association and the interactivity between the non-triggered keys and the current triggered key. Thus, the embodiments of the present disclosure may not only enrich the current interface, but also enhance the feedback effectiveness and user experience during the use of the interface.

Moreover, the processing result of the non-triggered keys may highlight the non-triggered keys or the current key. In this way, the method may not only make the triggered current key substantially obvious to the user, but also allow the user to timely discover an inadvertently triggered current key. Thus, the accuracy of the key operation may be improved.

DETAILED DESCRIPTION

The objectives, features, and advantages of the present disclosure will become clearer from the following description of the embodiments of the present disclosure when taken in conjunction with the accompanying drawings.

Method Embodiment

Figure 1:
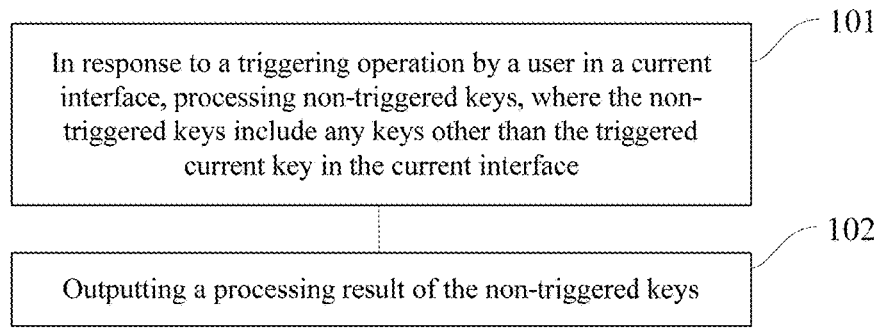
FIG. 1 illustrates a flow chart of an exemplary key processing method according to the present disclosure.

FIG. 1 illustrates a flow chart of an exemplary key processing method according to the present disclosure. As shown in FIG. 1, the method includes the following steps.

Step 101: in response to a triggering operation on a current key by a user in a current interface, processing a non-triggered key, where the non-triggered key is a key in the current interface other than the triggered current key.

Step 102: outputting a processing result of the non-triggered key.

In one embodiment, the key processing method may be applied to a smart terminal. The smart terminal may include, but is not limited to, a smart phone, a tablet computer, an e-book reader, an MP3 (MPEG-1 or MPEG-2 Audio Layer III) player, an MP4 (MPEG-4 Part 14) player, a laptop computer, a vehicle-mount computer, a desktop computer, a set-top box, a smart TV set, or a wearable device, etc.

The interface of the present disclosure may be embodied in any application program of the smart terminal. In some embodiments, the processing result of the non-triggered key may be outputted to the user in response to the triggering operation of the current key. The application program may provide the user with sophisticated interface data. For example, the input method program may provide an input interface for inputting. The input interface may include character keys and function keys to facilitate the user to input characters using the character keys or to trigger functions using function keys. It should be noted that the input interface of the input method program is intended to be illustrative. In practical applications, the interface of the present disclosure may further include other interface of other application program, such as a gaming program interface, and a video program interface, etc. That is, any interface including at least two keys (a currently triggered key and a non-triggered key) should fall within the protection scope of the interface of the present disclosure.

In one embodiment, the triggering operation may include a single click operation, a long press operation, a slide operation, etc. The single click operation may have a time of clicking the key shorter than a pre-configured time while the long press operation may have a time of clicking the key longer than a pre-configured time. The slide operation may generate a sliding trace that passes through the key on a touch screen. It should be understood that the triggering operations are intended to be illustrative and not limited by the present disclosure.

In one embodiment, the current key corresponding to a triggering operation may be called a triggered key. Except for the triggered key, any other key in the current interface may be called a non-triggered key. Both the number of the current key(s) and the number of the non-triggered key(s) may be one or greater than one. Neither the number of the current keys nor the number of the non-triggered keys is limited by the present disclosure. It should be noted that the non-triggered keys may be processed according to the present disclosure. All or some of the non-triggered keys may be processed. When only some of the non-triggered keys are processed, the processed portion of the non-triggered keys may be randomly selected, may include non-triggered key(s) located closest to the current key, may include non-triggered(s) belonging to a same section as the current key, non-triggered key(s) having identical or equivalent function to the current key, or may include the non-triggering keys having a pre-configured association relationship with the current key. The pre-configured association relationship may include a functional association, or a triggering sequence association, etc. The manner of selecting the non-triggered keys for processing is not limited by the present disclosure.

The present disclosure provides a technical solution for processing the non-triggered keys.

Technical Solution 1

In the technical solution 1, processing the non-triggered keys in response to a triggering operation of a current key by a user in a current interface (step 101) may include updating the non-triggered key in response to the triggering operation by the user on the current key in the current interface. The updating may include updating the interface data of the non-triggered key. The interface data corresponding to the updated non-triggered key(s) may be outputted (step 102). When the interface data of the non-triggered key(s) is character data, the updating may include changing color, changing boldness, or increasing font size, etc. When the interface data of the non-triggered keys is image data, the updating may include an image processing. The image processing may include rotating image, flipping image, overlaying image, or changing image color, etc. The manner of updating the non-triggered keys is not limited by the reset disclosure.

In one embodiment, updating the non-triggered keys in response to the triggering operation by the user on the current key in the current interface may include updating states of objects corresponding to the non-triggered keys in response to the triggering operation by the user on the current key in the current interface.

The objects of the non-triggered keys may include things representing the interface data of the non-triggered keys. In one embodiment, the objects of the non-triggered keys may include a person, an animal, a physical object, or a character, etc. When the objects of the non-triggered keys include a person or an animal, the states of the objects may include at least one of an expression state, a posture state, an orientation state, or a display attribute state, etc. The display attribute state may include a displaying state or a concealing state. That is, through updating the states of the objects, the output result of the non-triggered keys in response to the currently triggered key may enrich the current interface.

The present disclosure provides a technical sub-solution for updating the states of the objects of the non-triggered keys.

Technical Sub-solution 11

In the technical sub-solution 11, the updating may include updating the expression state. Accordingly, updating the states of the objects of the non-triggered keys in response to the triggering operation by the user on the current key in the current interface may include the following step.

Step A1: updating an expression state of an object corresponding to the non-triggered key to make the object face toward the current key in response to the triggering operation by the user on the current key in the current interface.

In one embodiment, updating the expression state may include updating from a first expression state to a second expression state. The first expression state may be an initial expression state or a last updated expression state. Updating from the first expression state to the second expression state may be with respect to a same non-triggered key. Different non-triggered keys may have a same expression state or different expression states at the same time.

In another embodiment, before the step A1, the method of the present disclosure may also include displaying a first initial interface. The first initial interface may include at least two keys. The at least two keys may be in the first initial expression state.

Processing the non-triggered keys in response to the triggering operation by the user on the current key in the current interface may include updating the expression states of the non-triggered keys to the second expression state to make the objects in the second expression state face toward the current key.

Figure 2:
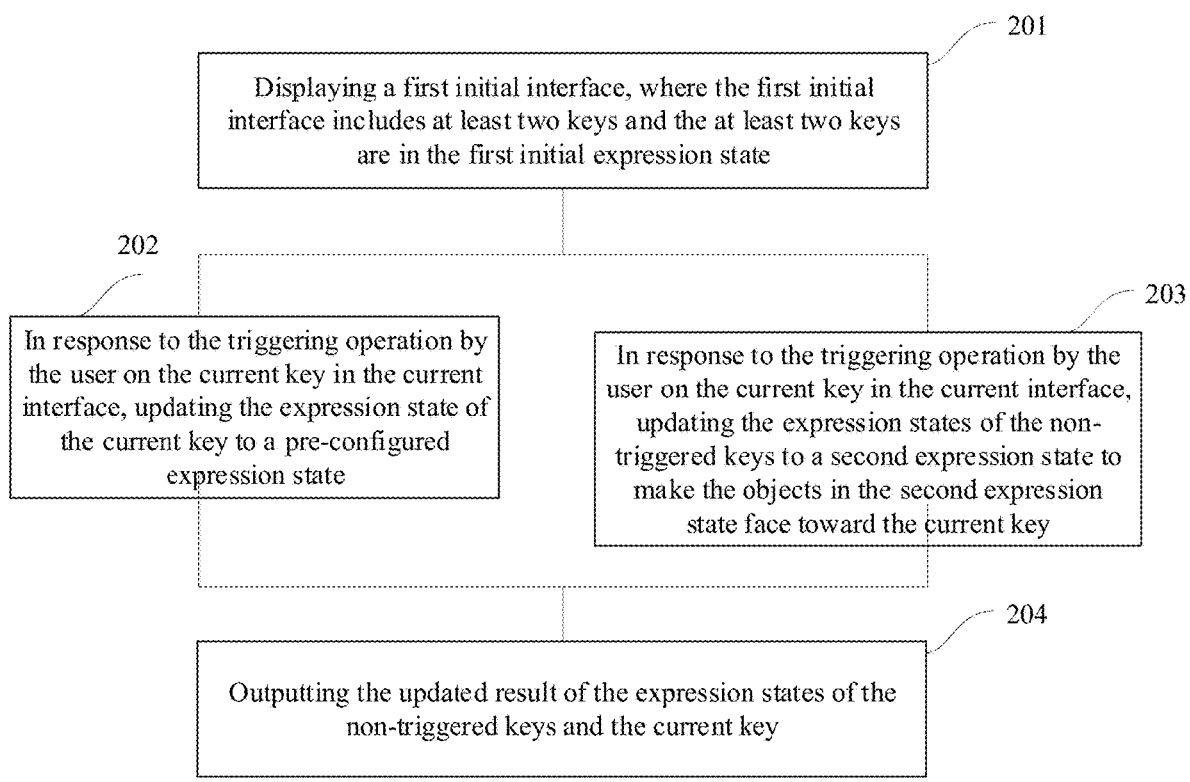
FIG. 2 illustrates a flow chart of a first application of an exemplary key processing method according to the present disclosure.

FIG. 2 illustrates a flow chart of Technical Sub-solution 11 of an exemplary key processing method according to the present disclosure. As shown in FIG. 2, the method includes the following steps.

Step 201: displaying a first initial interface, where the first initial interface includes at least two keys and the at least two keys are in the first initial expression state.

Step 202: in response to the triggering operation by the user on the current key in the current interface, updating the expression state of the current key to a pre-configured expression state.

Step 203: in response to the triggering operation by the user on the current key in the current interface, updating the expression states of the non-triggered key to a second expression state to make the objects in the second expression state face toward the current key.

Step 204: outputting the updated result of the expression states of the non-triggered key and the current key.

Figure 3A:
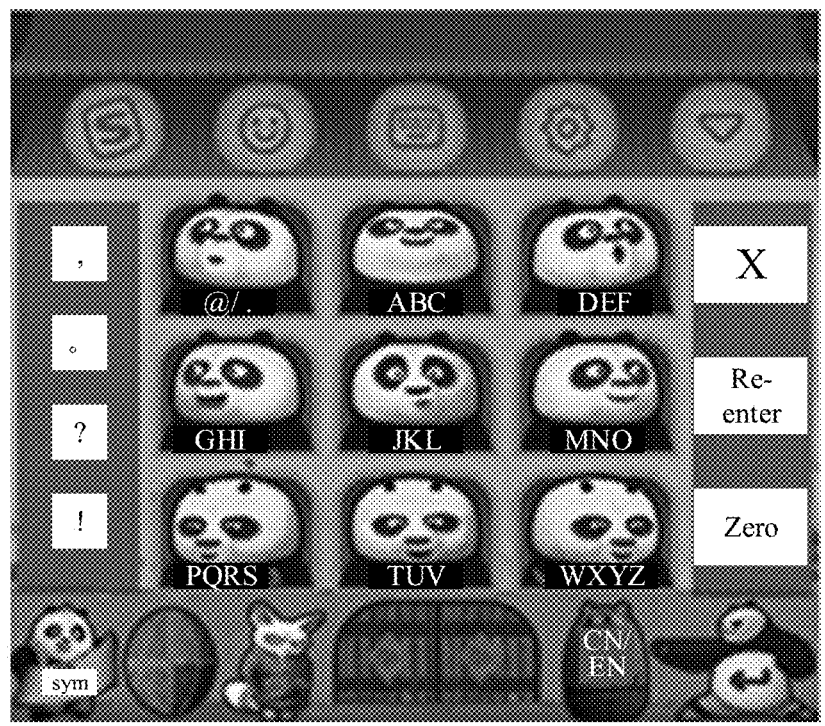
FIG. 3A illustrates a schematic diagram of an exemplary first initial interface according to the present disclosure.
Figure 3B:
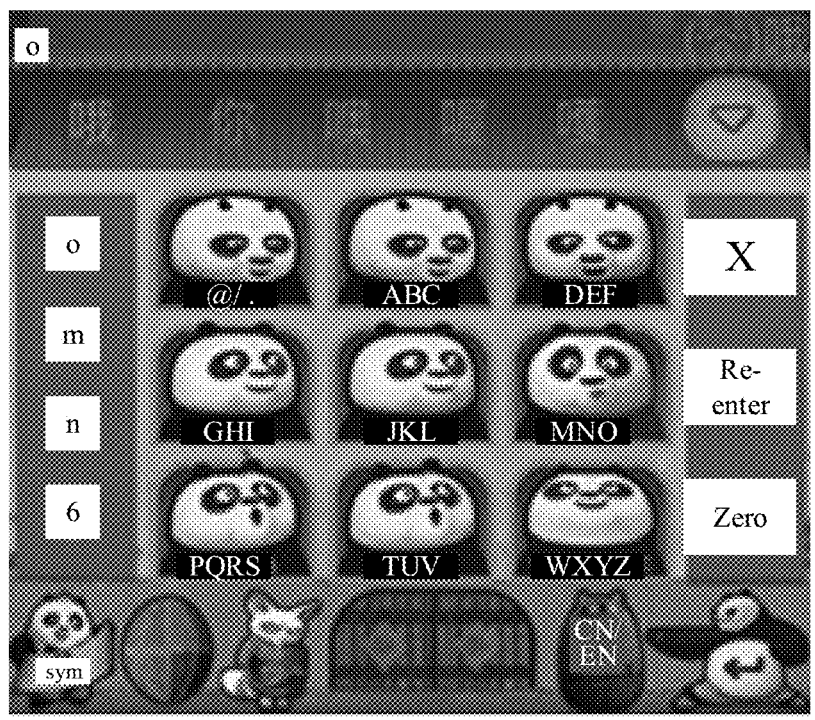
FIG. 3B illustrates a schematic diagram of an exemplary updated interface of FIG. 3A according to the present disclosure.

FIG. 3A illustrates a schematic diagram of an exemplary first initial interface according to the present disclosure. FIG. 3B illustrates a schematic diagram of an exemplary updated interface of FIG. 3A according to the present disclosure. The first initial interface may include an interface when the input method program is launched. The keys in the interface may be in the first initial expression state. The first initial expression state may be obtained through a random calculation or a pre-configuration. The interface may be updated to output the expression states of the non-triggered keys and the current key. As shown in FIG. 3A, the eyes of the panda head images corresponding to the keys face randomly toward different directions. After a click operation on the "MNO" key is received, through the step 203, the method may update the expression states of the panda head images of the eight non-triggered keys to the states of facing toward the "MNO" key. On the other hand, through the step 202, the method may update the expression state of the panda head image of the "MNO" key to the state of facing straight ahead. The updated result of the expression states of the non-triggered keys and the current "MNO" key is shown in FIG. 3B. For example, the non-triggered key located above the "MNO" key may have an expression state of facing down, the non-triggered key located below the "MNO" key may have an expression state of facing up, the non-triggered key located on the left of the "MNO" key may have an expression state of facing to the right, and the "MNO" key may have an expression state of facing straight ahead.

It can be seen that, after the click operation by the user on the current key in the current interface is received, the technical sub-solution 11 may not only update the expression state of the current key, but also update the expression states of the non-triggered keys, thereby enriching the current interface. Moreover, the association and the interaction between the non-triggered keys and the current key may improve the feedback effectiveness and user experience during the use of the interface.

It should be noted that the expression state of facing straight ahead as shown in FIG. 3B is intended to be illustrative, and not limited by the present disclosure. In addition, the 9-key keyboard in FIG. 3A and FIG. 3B is an example of the input interface in various embodiments of the present disclosure. In practical applications, the input interface may include a 26-key keyboard. In addition, FIG. 3A and FIG. 3B only show updating the expression states of nine character keys. In practical applications, based on the actual application requirements, those skilled in the art may also update the expression states of other character keys such as the "Zero" key and the "!" key in FIG. 3A and FIG. 3B, and the expression states of the function keys such as the "Re-enter" key in FIG. 3A and FIG. 3B.

In addition, it should be noted that, the steps 202, 203 and 204 may be executed repeatedly. That is, after the triggering operation of the current key corresponding to the step 204 is completed, the method may continue to execute the steps 202, 203, and 204. For example, after the click operation on the "WXYZ" key in FIG. 3B is received, the method may treat the "WXYZ" key as the current key and the other eight character keys as the non-triggered keys, and execute the steps 202, 203 and 204.

In addition, it should be noted that the embodiments of the present disclosure may perform the triggering operations consecutively to output the dynamic audio accordingly. The dynamic audio may be songs or melodies desired for the objects, or other suitable music. For example, when the objects are pandas, the dynamic audio may be the theme song of the movie "Kung Fu Panda". Thus, the key tones during the use of the interface may be enriched, and the interaction and user experience during the use of the interface may be improved.

Technical Sub-solution 12

In the technical sub-solution 12, the updating may include updating the posture state. Accordingly, updating the states of the objects of the non-triggered keys in response to the triggering operation by the user on the current key in the current interface may include the following step.

Step B1: updating the posture states of the objects of the non-triggered keys in response to the triggering operation by the user on the current key in the current interface.

In one embodiment, updating the posture state may include updating from a first posture state to a second posture state. The first posture state may be an initial posture state or a last updated posture state. Updating from the first posture state to the second posture state may be with respect to a same non-triggered key. Different non-triggered keys may have a same posture state or different posture states at the same time.

In another embodiment, the second posture state may be a pre-configured posture state different from the first posture state. For example, a plurality of pre-configured posture states may be obtained and stored in advance. A pre-configured posture state different from the first posture state may be randomly selected from the previously stored contents as the second posture state.

In another embodiment, consecutively occurred combination of the posture states of the objects of the non-triggered keys may be coupled with a combination of pre-configured posture states. The combination of the pre-configured posture states may include action items such as dances, or gymnastics, etc. Thus, one or more dance effects of the non-triggered keys may be presented.

In practical applications, the combination of the pre-configured posture states corresponding to the action items such as dances and gymnastics may be obtained and stored in advance. According to the sequence order of the triggering operations, the pre-configured posture states may be obtained sequentially from the combination of the pre-configured posture states to become the second posture states of the objects corresponding to the non-triggered keys. For example, a first sequence number of the pre-configured posture state may be obtained according to the sequence order from the combination of the pre-configured posture states, and a second sequence number of the pre-configured posture state may be obtained according to the sequence order from the combination of the pre-configured posture states. The second sequence number may be coupled with the first sequence number to obtain the corresponding second posture state. It should be understood that the process of obtaining the second posture state is not limited by the present disclosure.

Figure 4:
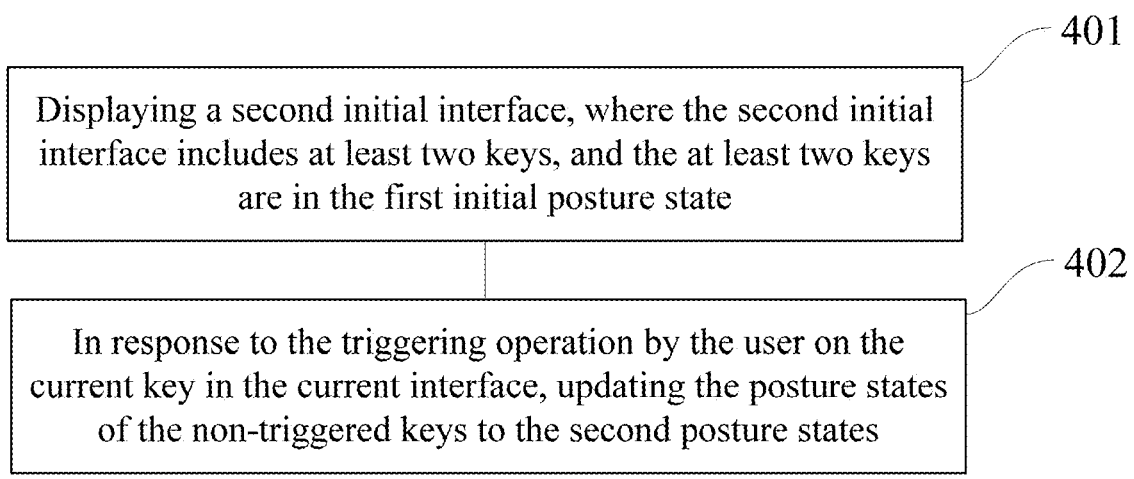
FIG. 4 illustrates a flow chart of a second application of an exemplary key processing method according to the present disclosure.

FIG. 4 illustrates a flow chart of Technical Solution 2 of an exemplary keyboard processing method according to the present disclosure. As shown in FIG. 4, the method includes the following steps.

Step 401: displaying a second initial interface, where the second initial interface includes at least two keys, and the at least two keys are in the first initial posture state.

Step 402: in response to the triggering operation by the user on the current key in the current interface, updating the posture states of the non-triggered keys to the second posture states.

The technical sub-solution 12 is described through an input interface of the input method program. In the second initial interface, the keys may be in a same first initial posture state. The first initial posture state may be a dance preparation posture state. After the triggering operation on the current key in the current interface is received, the posture state of the non-triggered keys may be updated to the posture state of a first dance move of the dance item, such as the posture state of stretching. After another triggering operation on the current key in the current interface is received, the posture state of the non-triggered keys may be updated to the posture state of a second dance move of the dance item, such as the posture state of standing on one leg. Assuming that the dance item includes N number of moves, the method of the present disclosure may sequentially display the posture states corresponding to the N number of moves of the dance item on the non-triggered keys in cycles with the consecutive triggering operations.

It should be noted that the method of the present disclosure may also output a dynamic audio in accordance with the consecutive triggering operations. The dynamic audio may be a song or a melody corresponding to the dance item, or other dance music. For example, the dynamic audio may include a classic tap dance music, a Swan Lake ballet dance music, or a stretching exercise music. Thus, a dance effect of one or more non-triggered keys may be displayed to substantially improve the interactivity during the use of the interface.

In addition, it should be noted that, in response to the triggering operation by the user on the current key in the current interface, the posture state of the current key may remain unchanged or may be updated according to the logic of the step 402. The handling of the posture state of the current key is not limited by the present disclosure.

Technical Solution 2

In the technical solution 2, a target key to be triggered after the current key may be predicted. Because the target key may include a non-triggered key, the non-triggered key may be processed.

Correspondingly, in response to the triggering operation by the user on the current key in the current interface, processing the non-triggered key may include, in response to the triggering operation by the user on the current key in the current interface, selecting a to-be-triggered target key based on predication from the non-triggered keys or all the keys. The process of outputting the processing result of the non-triggered keys may include displaying the target key according to a pre-configured display method.

In practical applications, the target key may be predicted based on the contents corresponding to the current key and the past keys before the current key. In one embodiment, in the process of inputting information using the Pinyin input method, the target key may be predicted based on the current Pinyin string that has not been display on the screen. For example, the current Pinyin string is "z". Based on the syllable rules, the predicted target characters corresponding to the current Pinyin string "z" may include "h", "a", "e", "l", "o", and "u". Further, the target key corresponding to the target character may be obtained. In another embodiment, in the process of inputting information using the English input method, the target key may be predicted based on the existing character string. The existing character string may include the characters succeeding the last punctuation symbol. For example, assuming that the user intends to input a long sentence "The Internet makes my life more interesting and colorful", and the character string includes "The Internet makes my life more in", English words started with "in" may be looked up in an English dictionary based on the existing character string "in". The English words started with "in" may include "interesting", and "inside", etc. Further, the target key may be obtained. The existing character string may include characters succeeding a non-English character. For example, the character string may include "Wireless Fidelity Wi". Based on the existing character string "Wi", English words started with "Wi" may be looked up in the English dictionary. The English words started with "Wi" may include "Wireless" and "with", etc. Further, the corresponding target key may be obtained. It should be understood that language modeling technology may be used in predicting the target key. The process of predicting the target key is not limited by the present disclosure.

The pre-configured display method may include one or more of the following display methods.

Display method 1: marking the target key by changing the character font or color of the target key. For example, the character of the target key may be changed to bold, larger font size, underlined, italic, 3-dimensional, different character color, or different background color. Compared to the normal font or normal color of the normal key, the marked target key may be substantially obvious to be recognized.

Step A2: marking the target key at the same time of displaying the target key. The marking of the target key may be graphically displayed at a certain position of the target key, such as the upper portion, thereby making the target key substantially obvious to be recognized.

Figure 5A:
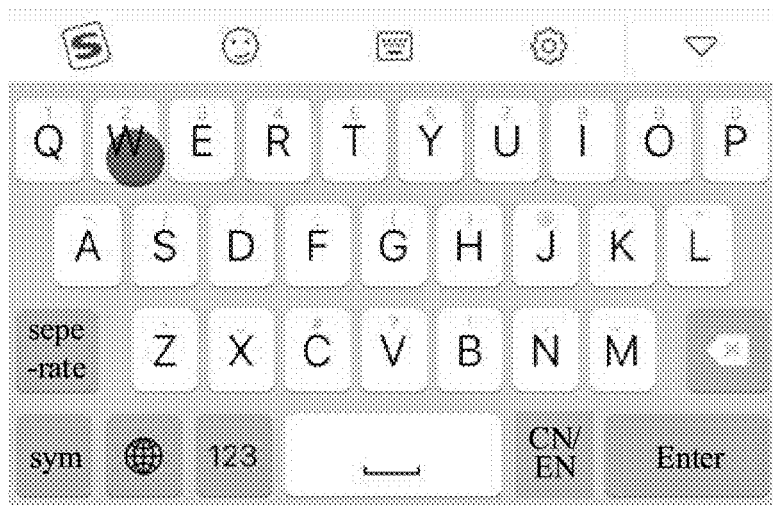
FIG. 5A illustrates a schematic diagram of an exemplary pre-update interface according to the present disclosure.
Figure 5B:
FIG. 5B illustrates a schematic diagram of an exemplary post-update interface of FIG. 5A according to the present disclosure.

FIG. 5A illustrates a schematic diagram of an exemplary pre-update interface according to the present disclosure. FIG. 5B illustrates a schematic diagram of an exemplary post-update interface of FIG. 5A according to the present disclosure. As shown in FIG. 5A and FIG. 5B, the input interface includes a 26-key keyboard in Chinese mode. After a triggering operation by a user on the "W" key is received, the "W" key is displayed with marking as shown in FIG. 5A. The target keys "A", "E", "O", and "U" corresponding to the "W" key are displayed with markings as shown in FIG. 5B. Because the target key is substantially obvious to be recognized as compared to other keys without any markings, the user may rapidly discover and input the target key. Thus, the embodiments of present disclosure may improve the efficiency of inputting the target key by the user.

Technical Solution 3

In the technical solution 1, the non-triggered keys may be updated. In the technical solution 3, the entire interface may be updated and the non-triggered keys may be updated as well. Correspondingly, in the technical solution 3, the keys may include at least two displaying types of keys. In response to the triggering operation by the user on the current key in the current interface, processing the non-triggered key may include, in response to the triggering operation by the user on the current key in the current interface, updating the current interface to change the displaying type of the non-triggered keys.

The displaying types of the keys may be divided according to displaying effects of the keys. In the process of updating, the keys may be in any displaying type. For example, assuming that the displaying types may include a first displaying type and a second displaying type. In the process of updating, the keys may be in either the first displaying type or the second displaying type.

In one embodiment, the process of updating the current interface may include determining a displaying type for the keys through a random calculation. In another embodiment, the process of updating the current interface may include determining the first displaying type for the keys based on a prediction of the to-be-triggered target key selected from all the keys. Because the prediction process in the technical solution 3 is similar to the prediction process in the technical solution 2, the description may be referenced.

In one embodiment, the first displaying type may include attribute features, and the second displaying type may include non attribute features. For example, the attribute features may include a gopher feature. After the key having the gopher feature is clicked, a target-hit effect may be outputted. The attribute features may also include a bubble feature, or a human character feature, etc. The attribute features are not limited by the present disclosure.

In various embodiments of the present disclosure, after the triggering operation by the user on the current key in the current interface is received, the current interface may be updated. The timing for updating the current interface may vary. For example, in one embodiment, the displaying type may include the first displaying type. In response to the triggering operation by the user on the current key in the current interface, the process of updating the current interface may include the following.

When the current key is a key of the first displaying type, a target-hit effect may be outputted on the key of the first displaying type. After the target-hit effect is outputted on the key of the first displaying type, the current interface may be updated.

When the current key is not a key of the first displaying type, the current interface may be updated.

Figure 6:
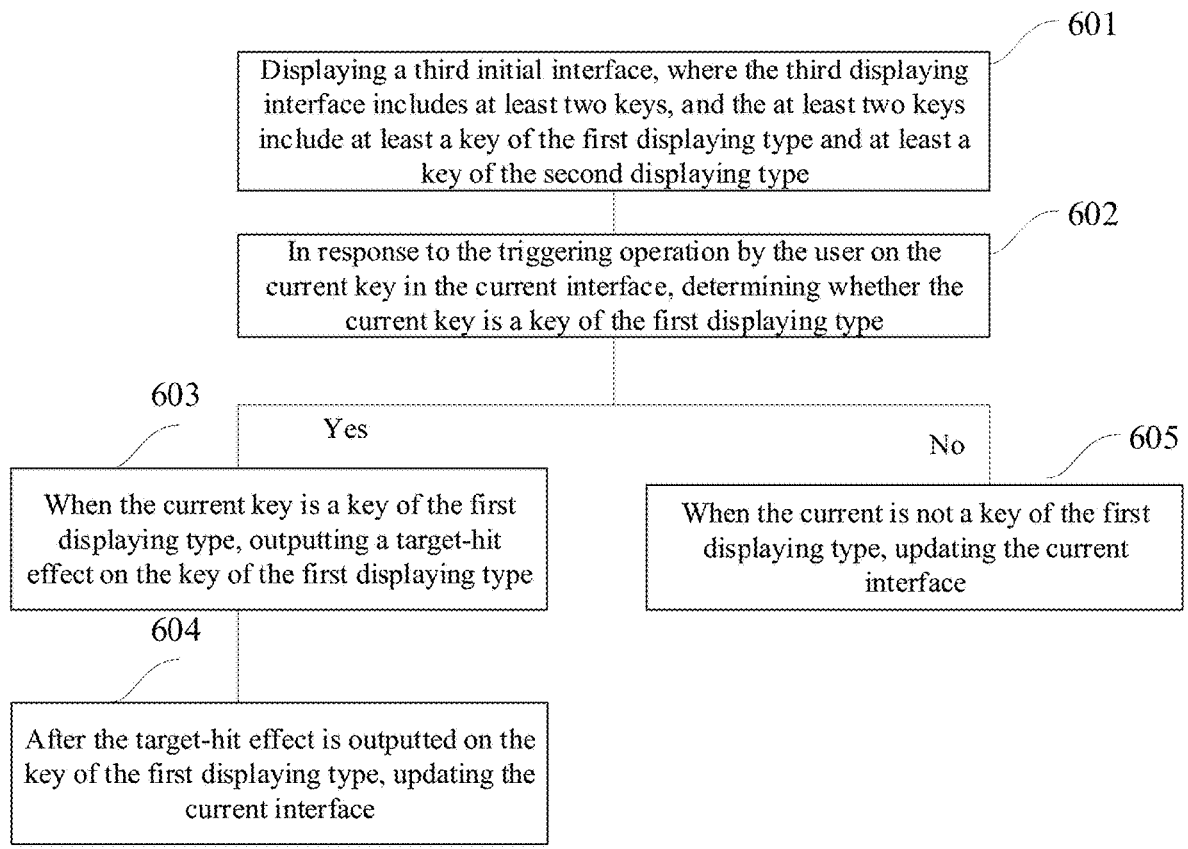
FIG. 6 illustrates a flow chart of a third application of an exemplary key processing method according to the present disclosure.

FIG. 6 illustrates a flow chart of Technical Solution 3 of an exemplary key processing method according to the present disclosure. As shown in FIG. 6, the method may include the following steps.

Step 601: displaying a third initial interface, where the third displaying interface includes at least two keys, and the at least two keys include at least a key of the first displaying type and at least a key of the second displaying type.

Step 602: in response to the triggering operation by the user on the current key in the current interface, determining whether the current key is a key of the first displaying type.

Step 603: when the current key is a key of the first displaying type, outputting a target-hit effect on the key of the first displaying type.

Step 604: after the target-hit effect is outputted on the key of the first displaying type, updating the current interface.

Here, the current interface may be an interface capable of outputting the target-hit effect on the key of the first displaying type.

Step 605: when the current is not a key of the first displaying type, updating the current interface.

Figure 7A:
FIG. 7A illustrates a schematic diagram of an exemplary first input interface according to the present disclosure.
Figure 7B:
FIG. 7B illustrates a schematic diagram of an exemplary second input interface according to the present disclosure.
Figure 7C:
FIG. 7C illustrates a schematic diagram of an exemplary third input interface according to the present disclosure.

FIG. 7A illustrates a schematic diagram of an exemplary first input interface according to the present disclosure. FIG. 7B illustrates a schematic diagram of an exemplary second input interface according to the present disclosure. FIG. 7C illustrates a schematic diagram of an exemplary third input interface according to the present disclosure. As shown in FIG. 7A, the first input interface may represent the interface at the time the input method program is launched. The gopher feature may be displayed on the "DEF" key, the "JKL" key, and the "WXYZ" key. After a triggering operation on the "JKL" key is received, the target-hit visual effect may be outputted in the second input interface shown in FIG. 7B. Based on the updating result, the keys displaying the gopher feature may be determined again. For example, in the third input interface shown in FIG. 7C, the "@/." key, the "GHI" key, and the "WXYZ" key may include the gopher feature. Because the "@/." key, the "GHI" key, and the "WXYZ" key are non-triggered keys, the change of the "@/." key, the "GHI" key, and the "WXYZ" key from the first input interface to the third input interface may be considered as the processing of the non-triggered keys.

It should be noted that, in various embodiments of the present disclosure, the dynamic audio may be outputted accompanying with the consecutive triggering operations. The dynamic audio, such as an audio mimicking a gopher being hit, may correspond to the attribute feature of the first displaying type. Thus, the key tones during the use of the interface may be enriched, and the interactivity and user experience during the use of the interface may be enhanced.

In addition, it should be noted that, when the number of occurrences of the keys of the first displaying type exceeds a certain threshold, a congratulation content may be outputted. The congratulation content may include texts, images, audios, and animations, etc. Thus, the interactivity and user experience during the use of the interface may be enhanced.

The processing of the non-triggered keys is described in detail in the technical solution 1 through the technical solution 3. It should be understood that those skilled in the art may use any one or a combination of the technical solution 1 through the technical solution 3 based on the actual application requirements, or may use other desired technical solutions to process the non-triggered keys. For example, the keys may be in a static state or a dynamic state. The keys in the initial interface may be in the static state. After a triggering operation by a user on the current key in the current interface is received, the non-triggered key may be updated to be in the dynamic state and the non-triggered keys in the dynamic state may be outputted. The non-triggered keys may return to the static state afterwards and wait for next triggering operation. That is, the processing of the non-triggered keys may include updating from the static state to the dynamic state. The dynamic state may include an applauding state. It should be understood that the technical solutions of processing the non-triggered keys are not limited by the present disclosure.

It should be noted that, in one embodiment, the method may also include, in response to the triggering operation by the user on the current key in the current interface, processing the current key and outputting the processing result of the current key. Processing the current key may be similar to processing the non-triggered keys, such as updating the current key and displaying the updated current key. In another example, the entire current interface may be updated, and the updated interface may be displayed. The process of updating the current key may include displaying the current key with marking as shown in FIG. 5B, or outputting the gopher-being-hit visual effect as shown in FIG. 7B. It should be understood that processing the current key is not limited by the present disclosure.

Further, the embodiments of the present disclosure may include the following beneficial effects.

First, in various embodiments of the present disclosure, in response to the triggering operation by the user on the current key in the current interface, the non-triggered keys excluding the current key in the current interface may be processed, and the processing result of the non-triggered keys may be outputted. In the existing solutions, only the operation corresponding to the current key may be performed. The embodiments of the present disclosure may output the processing result of the non-triggered keys based on the current key to the user, and may reflect the association and the interactivity between the non-triggered keys and the current key. Thus, the embodiments of the present disclosure may not only enrich the current interface, but also enhance the feedback effectiveness and user experience during the use of the interface. Moreover, the processing result of the non-triggered keys may indirectly highlight the current key. In this way, the method may not only make the triggered current key substantially obvious, but also allow the user to timely discover the inadvertently triggered current key. Thus, the accuracy of the key operation may be improved.

Second, the processing result of the non-triggered keys may include texts, images, audios, and animations, etc. Thus, the interactivity and user experience in the audiovisual aspect during the use of the interface may be enhanced.

Moreover, in various embodiments of the present disclosure, in response to the triggering operation by the user on the current key in the current interface, the triggered current key may be processed, and the processing result of the current key may be outputted. The processing result of the current key may directly highlight (by marking) the current key. In this way, the method may not only make the triggered current key substantially obvious, but also allow the user to timely discover the inadvertently triggered current key. Thus, the accuracy of the key operation may be improved.

Further, in various embodiments of the present disclosure, the to-be-triggered target key may be predicted based on the current key, and the target key may be displayed according to a pre-configured displaying manner. The user may not have to manually select the to-be-triggered key from a plurality of keys. Because the target key is selected from the plurality of keys based the inputting intent of the user, the user may swiftly select the to-be-triggered key from the target key. Thus, the embodiments of the present disclosure may not only increase the input efficiency of the target key by the user, but also avoid accidental clicking on the keys, thereby further improving the accuracy of key operations.

It should be noted that, for the simplicity of illustrations, the method embodiments may include a series of action combinations. However, those skilled in the art should be aware that the embodiments of the present disclosure are not limited by the sequence order of the actions. In various embodiments of the present disclosure, certain steps may be re-ordered or executed concurrently. Further, those skilled in the art should also understand that the embodiments described in the specification may include preferred embodiments, and the steps involved may not be necessarily required by the present disclosure.

Apparatus Embodiment

Figure 8:
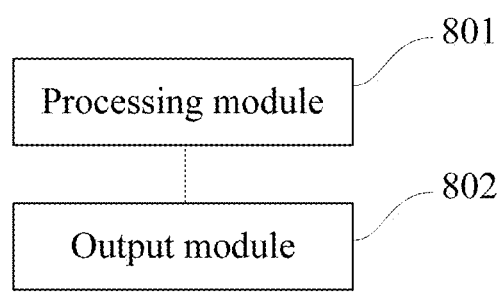
FIG. 8 illustrates a schematic diagram of an exemplary key processing apparatus according to the present disclosure.

FIG. 8 illustrates a schematic diagram of an exemplary key processing apparatus according to the present disclosure. As shown in FIG. 8, the apparatus may include:

a processing module 801 configured to process non-triggered keys in response to a triggering operation by a user on the current key in the current interface, where the non-triggered keys include any keys in the current interface excluding the current key, and an output module 802 configured to output the processing result of the non-triggered keys.

In one embodiment, the processing module 801 may include:

A first updating sub-module configured to update the non-triggered keys in response to the triggering operation by the user on the current key in the current interface.

In another embodiment, the processing module 801 may include:

a first updating sub-module configured to update the non-triggered keys in response to the triggering operation by the user on the current key in the current interface.

In another embodiment, the first updating sub-module may include:

a state updating unit configured to update the state of the object corresponding to the non-triggered key in response to the triggering operation by the user on the current key in the current interface.

In another embodiment, the state updating unit may include:

a first state updating sub-unit configured to update an expression state of the object corresponding to the non-triggered key to make the object corresponding to the updated expression state face toward the current key in response to the triggering operation by the user on the current key in the current interface.

In another embodiment, the state updating unit may include:

a second state updating sub-unit configured to update a posture state of the object corresponding to the non-triggered key in response to the triggering operation by the user on the current key in the current interface.

In another embodiment, the consecutively occurred posture state combination of the object corresponding to the non-triggered key may be coupled with a pre-configured posture state combination.

In another embodiment, the keys may include at least two displaying types of keys, and the processing module 801 may include:

a second updating sub-module configured to update the current interface to change a displaying type of the non-triggered key in response to the triggering operation by the user on the current key in the current interface.

In another embodiment, the displaying type may include a first displaying type.

The second updating sub-module may also include:

a first updating unit configured to output a target-hit effect on the keys of the first displaying type when the current key is a key of the first displaying type, and to update the current interface after the target-hit effect on the keys of the first displaying type is outputted, or a second updating unit configured to update the current interface when the current key is not a key of the first displaying type.

In another embodiment, the processing module 801 may include:

a prediction sub-module configured to select, based on prediction, the to-be-triggered target key from the non-triggered keys or all the keys.

The output module 802 may include:

a displaying sub-module configured to display the target key according to a pre-configured displaying manner.

Because the apparatus embodiments are similar to the method embodiments, the apparatus embodiments are described without substantial details. The description of the apparatus embodiments related to the method embodiments may be referenced.

The embodiments in the specification are described in a progressive manner. Each embodiment focuses on the differences from other embodiments. The same or similar parts of the embodiments can be reference to each other.

In various apparatus embodiments, the operation manners of individual modules, sub-modules, units, and sub-units are described in details in various method embodiments, and will not be duplicated here.

Figure 9:
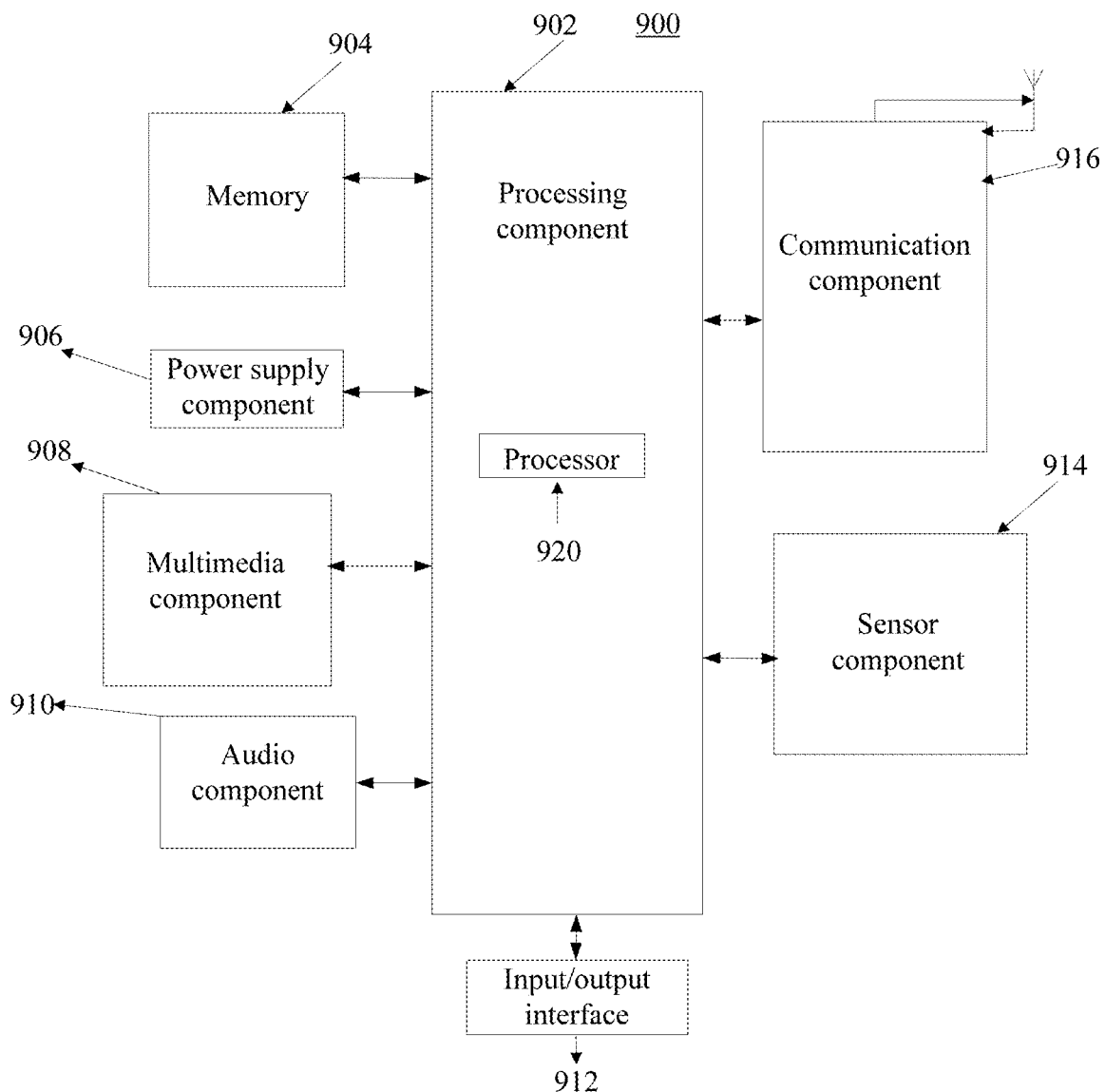
FIG. 9 illustrates a block diagram of an exemplary key processing apparatus according to the present disclosure.

FIG. 9 illustrates a block diagram of an exemplary key processing apparatus according to the present disclosure. For example, as shown in FIG. 9, the apparatus 900 may include a mobile phone, a computer, a digital media player, a message receiving device, a gaming control platform, a tablet computer, a medical device, a fitness device, or a personal digital assistant, etc.

Referring to FIG. 9, the apparatus 900 may include one of more of a processing component 902, a memory 904, a power supply component 906, a multimedia component 908, an audio component 910, an input/output interface 912, a sensor component 914, or a communication component 916.

The processing component 902 may often control the overall operation of the apparatus 900, such as displaying, making phone calls, data communication, camera operation, and logging operation. The processing component 902 may include one or more processors 920 to execute instructions to implement all or a portion of the steps of the disclosed method. In addition, the processing component 902 may include one or more modules for interactions between the processing component 902 and other components. For example, the processing component 902 may include a multimedia module for the interaction between the multimedia component 908 and the processing component 902.

The memory 904 may be configured to store various data to support the operation of the apparatus 900. For example, the data may include instructions of any application programs or methods operated on the apparatus 900, contact data, phone book data, messages, images, and videos, etc. The memory 904 may include any volatile or non-volatile memory or combination of both, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power supply component 906 may supply power to various components of the apparatus 900. The power supply component 906 may include a power management system, one or more power supplies, and other components for generating, managing, and distributing the power for the apparatus 900.

The multimedia component 908 may include a screen providing an output interface between the apparatus 900 and the user. In some embodiments, the screen may include a liquid crystal display (LCD) and a touch panel (TP). When the screen includes the touch panel, the screen may be a touch screen to receive input signals from the user. The touch panel may include one or more sensors to sense the touch, slide, and other gestures on the touch panel. The touch sensor may not only sense the boundary of touching or sliding, but also sense a time duration and pressure associated with touching or sliding operation. In some embodiments, the multimedia component 908 may include a front camera and/or a ear camera. When the apparatus 900 is in operation, such as in photo mode or video mode, the front camera and/or the rear camera may receive external multimedia data. Each of the front camera and/or the rear camera may include a fixed optical lens system or a variable focus lens system.

The audio component 910 may be configured to output and/or input audio signals. For example, the audio component 910 may include a microphone. When the apparatus 900 is in operation, such as in a calling mode, a logging mode, and a voice recognition mode, the microphone may be configured to receive external audio signals. The received audio signals may be stored in the memory 904 or may be transmitted through the communication component 916. In some embodiments, the audio component 910 may include a speaker configured to output audio signals.

The input/output interface 912 may provide the interface between the processing component 902 and the peripheral interface modules. The peripheral interface module may include a keyboard, a clicking wheel, or a button, etc. The button may include a main menu button, a volume button, a starting button, or a locking button.

The sensor component 914 may include one or more sensors to provide status evaluation of various aspects of the apparatus 900. For example, the sensor component 914 may detect open/close status of the apparatus 900, and relative positions of the components, such as a display and a keyboard of the apparatus 900. The sensor component 914 may detect a change of the position of the apparatus 900 or a component of the apparatus 900, a presence or absence of a user's touch on the apparatus 900, a location or acceleration/de-acceleration of the apparatus 900, and a change of the temperature of the apparatus 900. The sensor component 914 may include a proximity sensor to detect presence of any nearby object without any physical contact. The sensor component 914 may include a photo sensor, such as CMOS or CCD image sensor, in imaging applications. In some embodiments, the sensor component 914 may also include an acceleration sensor, a gyro sensor, a magnetic sensor, a pressure sensor, or a humidity sensor.

The communication component 916 may be configured to provide wired or wireless communication between the apparatus 900 and other equipment. The apparatus 900 may access a communication standard based wireless network, such as WiFi, 2G or 3G, or a combination thereof. In one embodiment, the communication component 916 may receive broadcast signals or broadcast related signals of an external broadcast management system through a broadcast signal channel. In one embodiment, the communication component 916 may also include a near field communication (NFC) module to facilitate short range communications. For example, the NFC module may include a radio frequency identification (RFID) technology, an infrared data association (IrDA) technology, an ultra-wideband (UWB) technology, a Bluetooth (BT) technology, and other technologies.

In some embodiments, the apparatus 900 may include one or more of an application specific integrated circuit (ASIC), a digital signal processor (DSP), a digital signal processing device (DSPD), a programmable logic array (PLD), a field programmable gate array (FPGA), a controller, a microcontroller, a microprocessor, or other electronic components to execute the method.

In some embodiments, the apparatus 900 may include an instruction-storing non-volatile computer readable storage medium, such as the instruction-storing memory 904. The instructions may be executed by the processors 920 of the apparatus 900 to implement the method. For example, the non-volatile computer readable storage medium may include a read-only memory (ROM), a random access memory (RAM), a CD-ROM, a magnetic tape, a floppy disk, and an optical data storage device.

When the instructions stored in a non-volatile computer readable storage medium are executed by a processor, the storage medium may facilitate the apparatus having the processor to execute a key processing method. The method may include processing the non-triggered keys in response to the triggering operation by the user on the current key in the current interface, where the non-triggered keys include any keys excluding the current key in the current interface, and outputting the processing result of the non-triggered keys.

Figure 10:
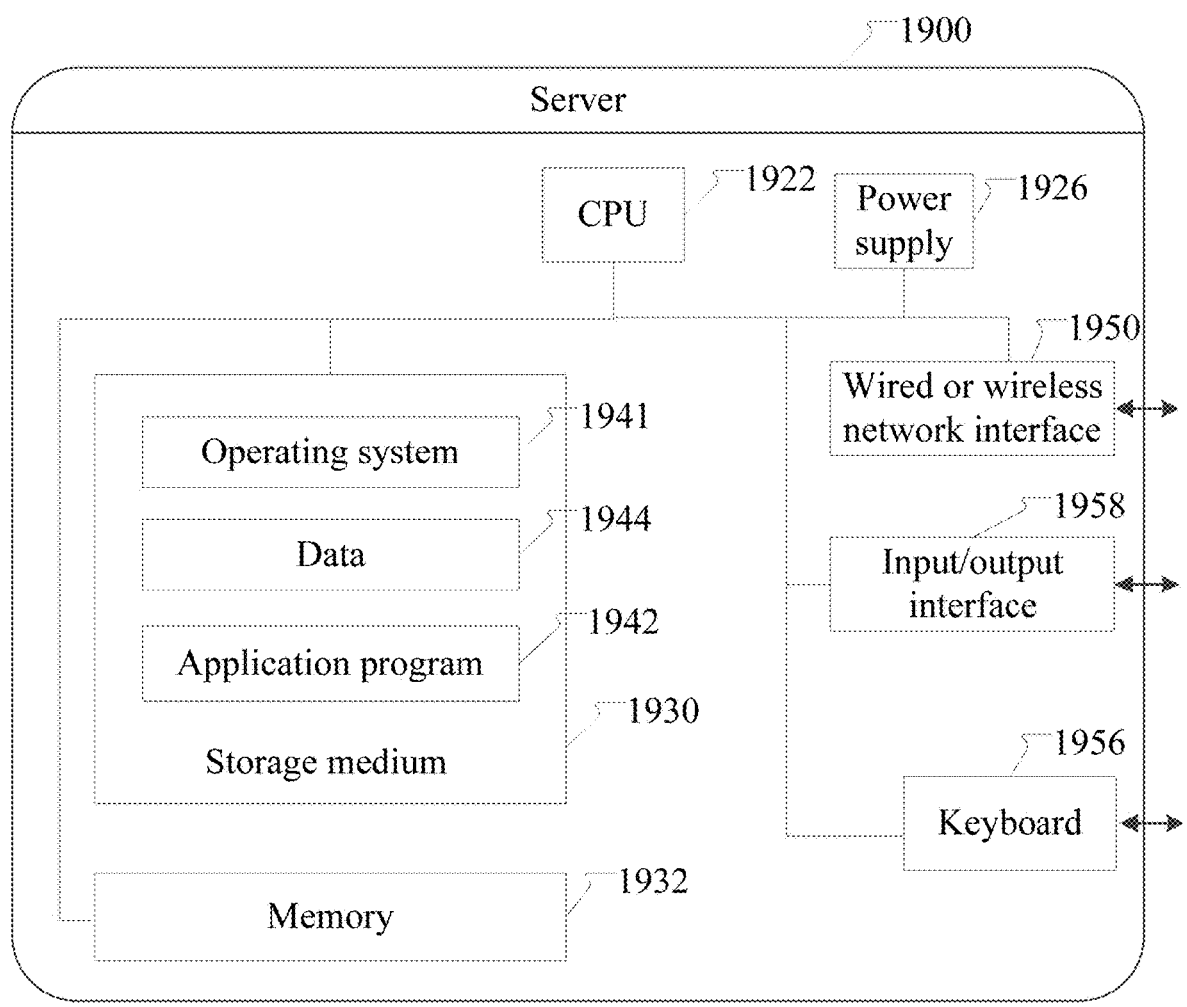
FIG. 10 illustrates a block diagram of an exemplary server according to the present disclosure.

FIG. 10 illustrates a block diagram of an exemplary server according to the present disclosure. As shown in FIG. 10, substantially varied in configurations and performances, the server 1900 may include one or more central processing units (CPU) 1922 (e.g., one or more processors), a memory 1932, and one or more storage media 1930 (e.g., one or more mass storage devices) storing application programs 1942 or data 1944. The memory 1932 and the storage media 1930 may be a temporary storage or a persistent storage. The application programs stored in the storage media 1930 may include one or more modules (not shown). Each module may include a series of instruction operations in the server. Further, in the server 1900, the central processing unit 1922 may be configured to communicate with the storage media 1930 and execute a series of instruction operations in the storage media 1930.

The server 1900 may also include one or more power supplies 1926, one or more wired or wireless network interfaces 1950, one or more input output interfaces 1958, one or more keyboards 1956, and/or one or more operating systems 1941, such as Windows Server™, Mac OS X™, Unix™, Linux™, and FreeBSD™, etc.

Figure 11:
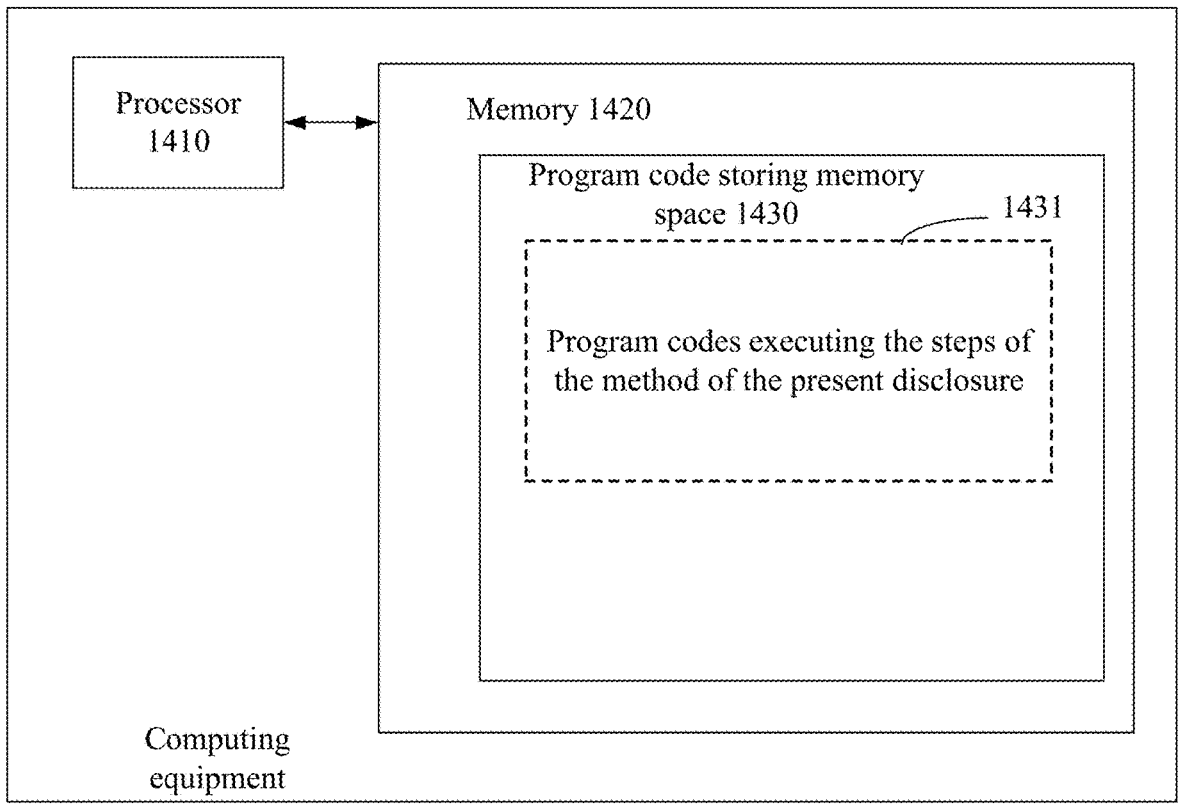
FIG. 11 illustrates a schematic diagram of an exemplary computing equipment for executing an exemplary key processing method according to the present disclosure.
Figure 12:
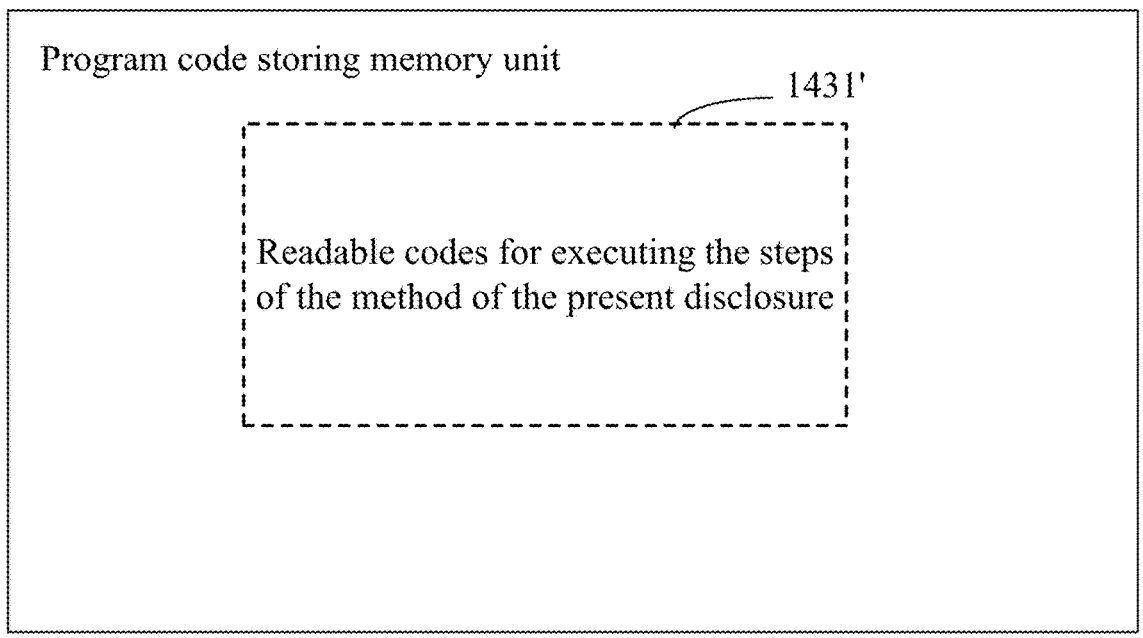
FIG. 12 illustrates a schematic diagram of an exemplary memory for maintaining or carrying program codes of an exemplary key processing method according to the present disclosure.

FIG. 11 illustrates a schematic diagram of an exemplary computing equipment for executing an exemplary key processing method according to the present disclosure. As shown in FIG. 11, the computing equipment traditionally includes a processor 1410, and a program product or computer readable medium in the form of a memory 1420. The memory 1420 may include an electronic memory, such as a flash memory, an electrically erasable programmable read-only memory (EEPROM), an erasable programmable read-only memory, or a read-only memory (RPM). The memory 1420 may include a memory space 1430 to store the program codes 1431 for executing the steps of the method embodiments. For example, the memory space 1430 to store the program codes may include various program codes 1431 for executing various steps of the method embodiments. The program codes may be retrieved from one or more program products or may be written to one or more program products. The program products may include a physical media such as a memory card to carry the program codes. FIG. 12 illustrates a schematic diagram of an exemplary memory for maintaining or carrying program codes of an exemplary key processing method according to the present disclosure. The program products are often carried in a portable or fixed memory unit as shown in FIG. 12. The memory unit may include memory segments and memory space similar to the memory 1420 in the computing equipment shown in FIG. 11. The program codes may be compressed in appropriate forms. Generally, the memory unit may include computer readable codes 1431', i.e., codes retrievable by a processor such as the processor 1410. When the codes are executed by the computing equipment, the computing equipment may perform various steps of the method embodiments.

Those skilled in the art will readily recognize other embodiments of the present application upon consideration of the specification and practice of the invention disclosed herein. This application is intended to cover any variations, uses, or adaptations of the present application, which follow the general principles of the application and include common knowledge or conventional techniques in the technical field not disclosed in the present disclosure. The description and examples are to be considered exemplary only, with the true scope and spirit of the application being indicated by the following claims.

It should be understood that the present application is not limited to the precise structure that has been described above and shown in the drawings, and various modifications and changes can be made without departing from the scope thereof. The scope of this application is limited only by the attached claims.

The foregoing descriptions are merely preferred embodiments of the present application and are not intended to limit the present application. Any modification, equivalent replacement, or improvement made within the spirit and principle of the present application shall be included in the protection of the present application.

The foregoing provides a detailed description of a key processing method, a key processing apparatus, and an apparatus for processing keys provided by the present disclosure. Specific examples are used in the present disclosure to explain the principle and implementation manners of the disclosure. The description of the foregoing embodiments is only for helping to understand the method and its core idea of the present disclosure. At the same time, those skilled in the art will change the specific implementation manner and application range according to the idea of the present disclosure. The contents of this specification should not be construed as limiting the present application.

What is claimed is:

1. A key processing method, comprising:
   in response to a triggering operation by a user on a current key in a current interface, processing a non-triggered key, wherein the non-triggered key is a key in the current interface other than the current key, and wherein processing the non-triggered key includes updating the non-triggered key, updating the non-triggered key includes updating a state of an object corresponding to the non-triggered key, and updating the state of the object includes updating a posture state of the object, wherein the posture state of the object is displayed on the non-triggered key at a time prior to the triggering operation on the current key, and wherein the posture state is coupled to a combination of pre-configured posture states; and
   outputting a processing result of the non-triggered key.

2. The method according to claim 1, wherein processing the non-triggered key in response to the triggering operation by the user on the current key in the current interface includes:
   in response to the triggering operation by the user on the current key in the current interface, updating the current interface to change a displaying type of at least one of the non-triggered key and the current key.

3. The method according to claim 1, wherein updating the current interface in response to the triggering operation by the user on the current key in the current interface includes:
   when the current key is a key of a first displaying type, outputting a target-hit effect on the key of the first displaying type, and updating the current interface after the target-hit effect is outputted on the key of the first displaying type; or
   when the current key is not a key of the first displaying type, updating the current interface.

4. The method according to claim 1,
   wherein processing the non-triggered key in response to the triggering operation by the user on the current key in the current interface includes: in response to the triggering operation by the user on the current key in the current interface, selecting a to-be-triggered target key from keys in the current interface; and
   wherein outputting the processing result of the non-triggered key includes: according to a pre-configured displaying manner, displaying the to-be-triggered target key.

5. The method according to claim 1, wherein the non-triggered key includes a plurality of non-triggered keys, and wherein processing the non-triggered key includes:
   processing a portion but not all of the plurality of the non-triggered keys.

6. The method according to claim 1, wherein the object includes at least a portion of a human figure or an animal figure.

7. The method according to claim 1, wherein updating the state of the object further includes updating an expression state of the object.

8. The method according to claim 1, wherein updating the state of the object further includes updating a facial expression of an animal figure.

9. An apparatus for key processing, comprising: one or more processors; and a memory storing one or more programs, wherein the one or more processors are configured to execute the one or more programs to perform:
   in response to a triggering operation by a user on a current key in a current interface, processing a non-triggered key, wherein the non-triggered key is a key in the current interface other than the current key, and wherein processing the non-triggered key includes updating the non-triggered key, updating the non-triggered key includes updating a state of an object corresponding to the non-triggered key, and updating the state of the object includes updating a posture state of the object, wherein the posture state of the object is displayed on the non-triggered key at a time prior to the triggering operation on the current key, and wherein the posture state is coupled to a combination of pre-configured posture states; and
   outputting a processing result of the non-triggered key.

10. The apparatus according to claim 9, wherein processing the non-triggered key comprises:
    in response to the triggering operation by the user on the current key in the current interface, updating the current interface to change a displaying type of at least one of the non-triggered key and the current key.

11. The apparatus according to claim 9, wherein updating the current interface comprises:
    when the current key is a key of a first displaying type, outputting a target-hit effect on the key of the first displaying type, and updating the current interface after the target-hit effect is outputted on the key of the first displaying type; or
    when the current key is not a key of the first displaying type, updating the current interface.

12. The apparatus according to claim 9,
    wherein processing the non-triggered key comprises: in response to the triggering operation by the user on the current key in the current interface, selecting a to-be-triggered target key from keys in the current interface; and
    wherein outputting the processing result of the non-triggered key includes: according to a pre-configured displaying manner, displaying the to-be-triggered target key.

13. The apparatus according to claim 9, wherein the non-triggered key includes a plurality of non-triggered keys, and wherein processing the non-triggered key includes:
    processing a portion but not all of the plurality of the non-triggered keys.

14. A non-transitory storage medium storing computer-readable instructions executable by at least one processor to perform:
    in response to a triggering operation by a user on a current key in a current interface, processing a non-triggered key, wherein the non-triggered key is a key in the current interface other than the current key, and wherein processing the non-triggered key includes updating the non-triggered key, updating the non-triggered key includes updating a state of an object corresponding to the non-triggered key, and updating the state of the object includes updating a posture state of the object, wherein the posture state of the object is displayed on the non-triggered key at a time prior to the triggering operation on the current key, and wherein the posture state is coupled to a combination of pre-configured posture states; and
    outputting a processing result of the non-triggered key.

15. The non-transitory storage medium according to claim 14, wherein the non-triggered key includes a plurality of non-triggered keys, and wherein processing the non-triggered key includes:

processing a portion but not all of the plurality of the non-triggered keys.

\* \* \* \* \*